June 9, 1925.

J. L. GOODWIN ET AL 1,541,348

DIRECTION SIGNAL FOR MOTOR VEHICLES

Filed Dec. 6, 1921

INVENTORS
Jay L. Goodwin an
Almon B. Washburn
BY
ATTORNEY

Patented June 9, 1925.

1,541,348

UNITED STATES PATENT OFFICE.

JAY L. GOODWIN, OF FRESNO, AND ALMON B. WASHBURN, OF HANFORD, CALIFORNIA.

DIRECTION SIGNAL FOR MOTOR VEHICLES.

Application filed December 6, 1921. Serial No. 520,218.

*To all whom it may concern:*

Be it known that we, JAY L. GOODWIN and ALMON B. WASHBURN, citizens of the United States, residing at Fresno and Hanford, in the counties of Fresno and Kings, respectively, and State of California, have invented certain new and useful Improvements in Direction Signals for Motor Vehicles; and we do declare the following to be a full, clear, and exact description of the same, reference being had to the accompanying drawings and to the characters of reference marked thereon, which form a part of this application.

This invention relates to improvements in direction signals for motor vehicles of all kinds, and especially to a form of signal adapted for night usage.

The principal object of our invention is to provide a hand signal member which will be extended by the driver of the car at night, and which is provided with an electric lamp which will be clearly visible to a car behind or coming.

Our signal is a portable member, and is held in the driver's hand while he extends his arm in the usual manner, and which is the most commonly used method of giving signals. When attempting to give signals at night however by extending the hand of arm alone, it is very often difficult if not impossible for the hand to be seen in the darkness, with the result that serious collisions and other accidents occur.

When using our signal however, a light accompanies the hand, not only visible of itself but partially or wholly illuminating the hand holding the device.

At the same time, this light will not be apt to project after a turn or other movement is made, as is commonly the case with mechanical signals whose operators forget to retract the same, resulting in confusion. Our device will not have this defective feature, since being held in the hand, it will be withdrawn or retracted as soon as the driver draws in his arm, which naturally is as soon as the necessity for giving the signal is over.

Another object of our invention is to provide a simple means for holding the signal when not in use, and for breaking the circuit to the lamp at the same time, so that the operator does not have to press a button every time he uses the signal, nor yet is the lamp burning continuously.

We have also provided means for enabling the signal to be extended any necessary distance, without having a tangle of slack current—conducting cable when the signal is contracted.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claims.

In the drawings similar characters of reference indicate corresponding parts in the several views.

Figure 1:
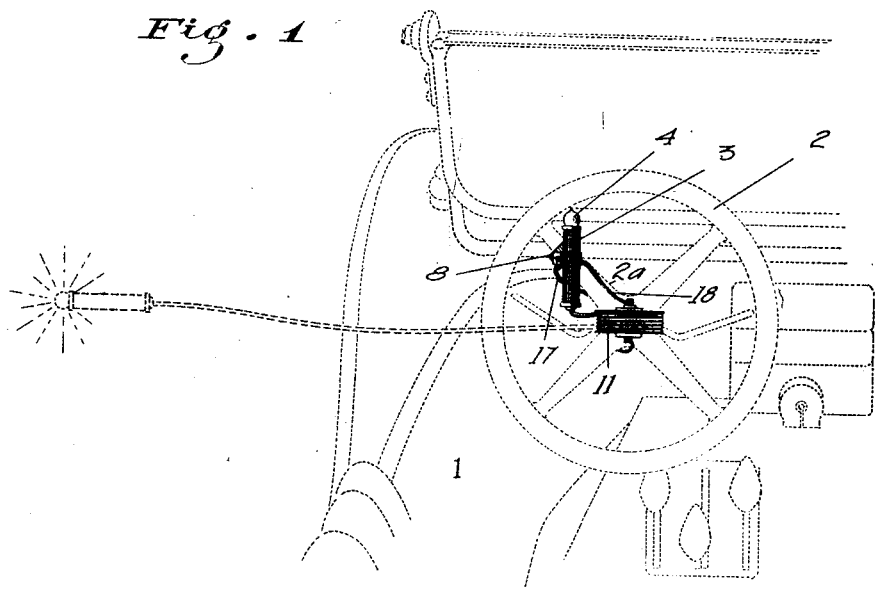
Fig. 1 is a fragmentary outline of the driver's compartment of an automobile, showing our signal device as installed in connection therewith.
Figure 2:
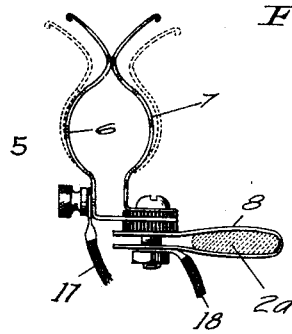
Fig. 2 is an enlarged detached view of a combined holding clip and switch.
Figure 3:
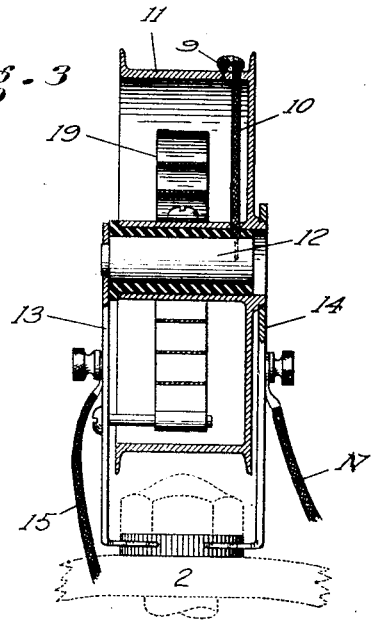
Fig. 3 is an enlarged sectional view of an automatic-winding reel.
Figure 4:
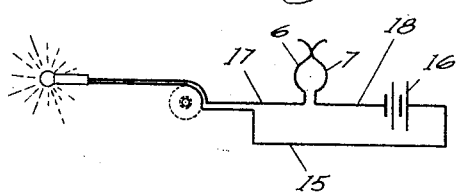
Fig. 4 is a diagram of the circuit employed.

Referring now more particularly to the characters of reference on the drawings, the numeral 1 denotes in general a motor car of any design, having the usual steering wheel 2.

Our improved signal device itself comprises a handle member 3, of insulation material, on one end of which is an electric lamp 4.

The handle portion is adapted to be held when not in use by means of a spring clip 5 comprising a pair of current conducting plates 6 and 7, insulated from each other and mounted in common for swivel movement on an adjustable clamp 8 adapted to be attached to one of the spokes 2ª of the steering wheel 2.

The members 6 and 7 are as stated insulated from each other at one end, but are adapted to contact with each other at the opposite end when the handle 3 is removed from therebetween, and to be separated when the handle is held by said clip.

The wires 9 and 10 from the lamp member are wound about a reel 11 having a shaft 12 insulated therefrom and journaled in a support 13, while the reel itself is journaled on the opposite side in another support 14, these supports being insulated from each other but connected together to form a common bracket adapted, as shown in the present instance, to be mounted on top of the steering wheel centrally thereof.

The wire 9 is connected directly to the drum or reel 11, while the wire 10 is connected to the insulated shaft 12. From the support or bracket member 13 a wire 15 leads to a source of electrical energy as at 16, while from the member 14 a wire 17 leads to the member 6. From the other clip member 7 a wire 18 leads to the other pole of the source 16, thus completing a circuit.

In practice, the wires 15 and 18 are preferably tapped into the standard light-wiring of the car, so as to come within range of the operation of the lighting switch usually provided, and so eliminating the need of an extra switch to break the signal circuit in daytime.

In installing the device, it is of course desirable that the wires leading to the source of power from the reel-contact and switch be concealed as far as practicable, so as to give as neat an appearance to the installation as possible.

The cable formed by the combined wires 9 and 10 is kept wound on the reel to take up all slack when the lamp member is in the holding clip 5 by means of a coil or similar form of spring 19 mounted to the reel and one of the supporting bracket members.

While we have shown the reel and clip mounted in connection with the steering wheel, as being about the handiest place for the driver, it is of course not essential that they be so mounted, as these members could be attached to the side of the car or similar place if desired.

In operation, it will be evident that it is only necessary for the driver to grasp the handle 3, lift it from the slip and extend it with his arm, holding the lamp end naturally outwardly.

The lamp, which may of course be of any color and provided with reflecting means if desired, will be lit as soon as the handle is removed from the clip, as will be evident from the foregoing description of the construction and arrangement of parts.

When the signal has been given, the lamp member is returned to the clip, when the lamp is automatically extinguished.

From the foregoing description it will be readily seen that we have produced such a device as substantially fulfills the objects of the invention as set forth herein.

While this specification sets forth in detail, the present and preferred construction of the device, still in practice such deviations from such detail may be resorted to as do not form a departure from the spirit of the invention, as defined by the appended claim.

Having thus described our invention, what we claim as new and useful and desire to secure by Letters Patent is:

A reel structure comprising a pair of spaced conductor-arms, a shaft journaled in one arm, a sleeve about the shaft and journaled in the other arm, an insulation bushing between the shaft and sleeve, a drum provided with the sleeve in spaced relation thereto, and a double-wire cable wound on the drum, one wire of the cable being connected direct to the drum and the other wire passing through the drum and sleeve in insulated relation thereto and being then connected to the shaft.

In testimony whereof we affix our signatures.

JAY L. GOODWIN.
ALMON B. WASHBURN.